Patented Feb. 11, 1941

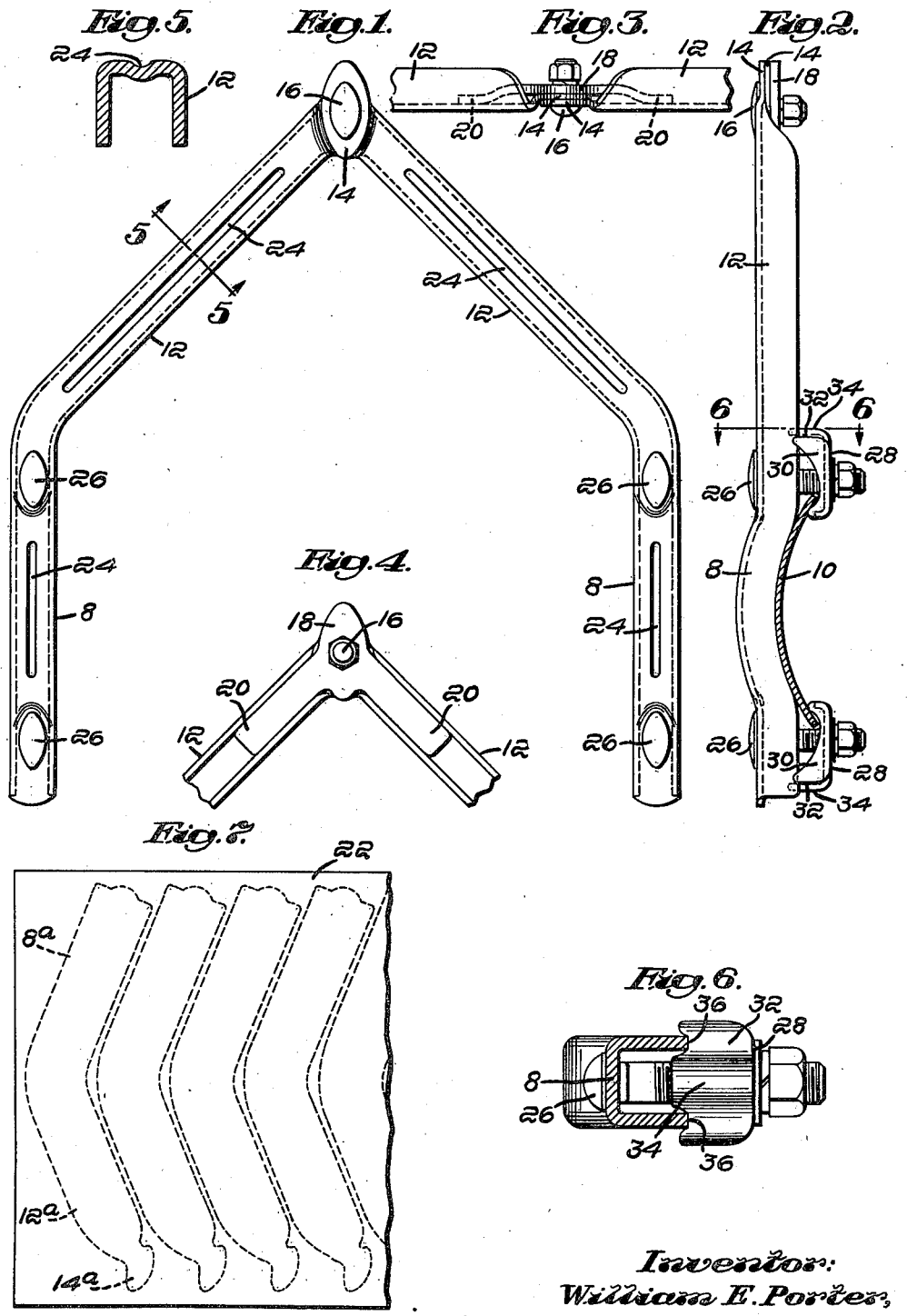

2,231,592

UNITED STATES PATENT OFFICE 2,231,592

AUXILIARY BUMPER

William E. Porter, Lowell, Mass., assignor, by mesne assignments, to American Chain & Cable Company, Inc., New York, N. Y., a corporation of New York Application July 9, 1937, Serial No. 152,767

8 Claims. (Cl. 293—55)

The ordinary bumper utilized on automobiles, whether in one or several parts, consists essentially of a horizontally disposed bar of limited vertical dimension extending across the width of the vehicle. Since automobiles differ in height and since even in vehicles of the same kind the elevation of the bumper above the road will vary in accordance with the load on the vehicle, considerable inconvenience and damage is caused by a bumper of one car passing above or below another or interlocking therewith. My invention relates to that class of auxiliary attachments for such a horizontal bumper bar which, at least in cooperation with the horizontal bumper bar itself, forms an open-centered figure whereby a barrier extending over a considerable vertical and transverse area is presented without undue bulk. The object is to provide a light, strong and inexpensive device of this nature.

My invention will be well understood by reference to the following description of the illustrative embodiment thereof shown by way of example in the accompanying drawing, wherein:

Fig. 1 is a front elevation of the auxiliary bumper;

Fig. 2 is a side elevation showing it in position on the horizontal bumper bar which appears in section;

Fig. 3 is a fragmentary top plan;

Fig. 4 is a rear elevation of the upper portion of the auxiliary bumper;

Figs. 5 and 6 are sections on the lines 5—5 of Fig. 1 and 6—6 of Fig. 2, respectively, and are on a larger scale; and Fig. 7 is a diagram illustrating how the blanks from which elements of the bumper are formed may be cut out from a strip of metal.

Referring to Figs. 1 and 2 of the drawing, the auxiliary bumper there illustrated comprises vertical parts 8 adapted to overlie and be secured to the horizontal bumper bar 10 (Fig. 2) and converging parts 12 arising therefrom which are connected together, in the present instance directly, to form the apex of a substantially triangular structure above the top of the horizontal bar 10.

Herein the bumper is formed of two cranked channels of relatively restricted width and of substantial depth in the flange to give rigidity, each section providing one of the vertical portions 8 and by virtue of the crank or bend therein one of the converging portions 12. The two parts are right and left hand, as will be well understood. The web of each channel may be extended at the upper end of the section 12 to provide for securing them together. Herein the connection is direct and the two extensions 14 overlap and are secured together by a suitable bolt 16. The bolt 16 may have an ornamental head harmonizing with the desired tasteful formation of the extension which gives a finish and ornament to the upper portion of the auxiliary bumper.

To reinforce the connection and insure rigidity I may provide a heavy washer-like plate 18 through which bolt 16 passes which may have a central portion extending throughout the area of the extensions 14 to support the same and leg portions 20 which fit in between the flanges of the channels 12, as best seen in Figs. 3 and 4.

In Fig. 7 I have shown a strip of metal 22 and indicated in dotted lines thereon blanks which may be cut therefrom having the parts 8a which may be bent over to form the channel sections 8, the parts 12a at an angle thereto corresponding to the angle between the parts 8 and 12 and which may be bent to form the channel sections 12 and the parts 14a which form the extensions 14. It will be seen how simply these blanks are cut out and with what little waste. The resulting bumper is light and strong and, while of considerable area, can be readily knocked down for shipment or storage by withdrawing the single bolt 14.

In bending the blanks shown in Fig. 7 to channel shape they may be given suitable decorations in the stamping process, as, for example, by forming the depressions 24 therein, as best shown in Fig. 5, which desirably may in the complete bumper, as seen in Fig. 1, form lines of contrasting color.

As best seen in Fig. 2, the vertical portions 8 of the sections are suitably formed to seat against the front of the horizontal bumper bar 10. To secure them in position I may provide bolts 26, preferably having ornamental heads harmonizing with the design of the bumper, as seen in Fig. 1, and adapted to extend rearwardly across the edge of the horizontal bumper bar 10. These bolts cooperate with suitable means for engaging the rear surface of the bumper and I herein show suitable clips engaging over the margins of the bumper and having a supporting bearing on the auxiliary bumper. These clips may be pressed up from heavy sheet metal and preferably have a box-like form, as seen in Fig. 2, this box having an open front and a rear wall 28 through which the bolt passes. The side walls 30 may be recessed, as seen in Fig. 2, to engage about the edge of the bumper bar, the remaining portion of the side walls forming a reinforcing fillet for the outer end wall 32 which also may be strengthened as by the expressed rib 34. As best seen in Fig. 6, the end wall 32 is provided with grooves 36 in which the edges of the channel flanges seat whereby the parts are interlocked together and the clips thus support and reinforce these flanges.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. An auxiliary bumper for attachment in upright position to the horizontal bar of a vehicle bumper comprising a pair of channels having rearwardly directed flanges adapted to seat on the bumper bar, the channels having converging portions and a connecting member having legs housed in the channels and connecting the ends of the converging portions, the channels so connected, when in position on the bar, defining therewith an open-centered figure.

2. An auxiliary bumper for attachment in upright position to the horizontal bar of a vehicle bumper comprising a pair of channels having rearwardly directed flanges adapted to seat on the bumper bar, the channels having converging portions, the webs of the channels being terminally extended and overlapping, and means securing the overlapping portions together, the channels so connected, when in position on the bar, defining therewith an open-centered figure.

3. An auxiliary bumper for attachment in upright position to the horizontal bar of a vehicle bumper comprising a pair of channels having rearwardly directed flanges adapted to seat on the bumper bar, the channels having converging portions, the webs of the channels being terminally extended and overlapping, a bolt extending through the overlapping portions, and a plate secured to said bolt having legs fitting into the channels at the ends of the converging portions, the channels so connected, when in position on the bar, defining therewith an open-centered figure.

4. An auxiliary bumper for attachment in upright position to a horizontal bumper bar comprising a channel portion crossing the bar with its flanges presented toward the same, means locking the channel to one edge of the bar, and means for securing it at the opposite end including a bolt for engagement with the channel to extend across said edge comprising a sheet metal clip substantially in the form of an open front box, the rear of the box being apertured to pass the bolt, the side walls being recessed near one end to engage the end of the bar and the other end having grooves to engage the channel.

5. An auxiliary bumper for attachment in upright position to the horizontal bar of a vehicle bumper and defining with the bumper bar an open-centered figure embodying in its construction relatively narrow and deep channels crossing the bar and seated thereagainst, and means to secure the same at either edge of the horizontal bar including a clip having an end to engage behind the margin of the bar and a forwardly extending flange having grooves, to receive the flanges of the channels and a bolt for securing the clip to the channel.

6. An auxiliary bumper for attachment in upright position to the horizontal bar of a vehicle bumper and defining with the bumper bar an open-centered figure comprising a pair of channel members having rearwardly directed flanges adapted to seat on the bumper, each comprising an upright portion for application to the bumper bar and an inwardly inclined portion, and means connecting the upper extremities of said inclined portions to complete the figure, said connecting means having laterally extending rigidly related legs seated between the flanges of the channels.

7. An auxiliary bumper for attachment in upright position to the horizontal bar of a vehicle bumper comprising a pair of channels having rearwardly directed flanges adapted to seat on the bumper bar, the channels having converging portions, the webs of the channels overlapping, and means securing the overlapping portions together, the channels so connected, when in position on the bar, defining therewith an open-centered figure.

8. An auxiliary bumper for attachment in upright position to the horizontal bar of a vehicle bumper comprising a pair of channels having rearwardly directed flanges adapted to seat on the bumper bar, the channels having converging portions, the ends of the converging portions lying in face to face contact, and means securing the contacting portions together, the channels so connected, when in position on the bar, defining therewith an open-centered figure.

WILLIAM E. PORTER.